United States Patent [19]
Bernal et al.

[11] Patent Number: 5,415,262
[45] Date of Patent: May 16, 1995

[54] CARBON TO CARBON FRICTION MECHANISM

[75] Inventors: Christopher P. Bernal, Los Alamos; Roger H. Hendrix, Santa Maria; McLane Tilton, Solvang, all of Calif.

[73] Assignee: Tilton Engineering, Inc., Buellton, Calif.

[21] Appl. No.: 208,082

[22] Filed: Mar. 8, 1994

Related U.S. Application Data

[63] Continuation of Ser. No. 929,299, Aug. 13, 1992, abandoned.

[51] Int. Cl.⁶ .................... F16D 13/56; F16D 13/68
[52] U.S. Cl. ........................... 192/70.19; 192/70.27; 192/89.23
[58] Field of Search ............ 192/70.19, 70.27, 109 A, 192/109 R, 107 R, 70.2, 89.23

[56] References Cited

U.S. PATENT DOCUMENTS

| | | | |
|---|---|---|---|
| 1,344,399 | 6/1920 | Holt . | |
| 1,423,833 | 7/1922 | Craighead | 192/107 R |
| 1,460,454 | 7/1923 | Swenson | 192/70.27 X |
| 1,510,123 | 9/1924 | Wemp | 192/70.27 |
| 1,531,341 | 3/1925 | Lichtenberg . | |
| 1,554,394 | 9/1925 | White . | |
| 1,717,534 | 6/1929 | Wemp | 192/70.27 X |
| 1,756,428 | 4/1930 | Jones | 192/70.27 |
| 1,756,731 | 4/1930 | Desroziers . | |
| 1,803,077 | 4/1931 | Spase . | |
| 1,855,937 | 4/1932 | Callsen . | |
| 1,954,190 | 4/1934 | Zeder . | |
| 1,963,188 | 6/1934 | Wood . | |
| 1,977,368 | 10/1934 | Wood . | |
| 2,002,943 | 5/1935 | Hartley | 192/70.27 X |
| 2,016,305 | 10/1935 | Wales . | |
| 2,910,148 | 10/1959 | Ferrell et al. | 192/107 R X |
| 2,925,897 | 2/1960 | Snyder . | |
| 3,010,555 | 11/1961 | Garmager | 192/109 A |
| 3,033,326 | 5/1962 | Byers . | |
| 3,075,691 | 1/1963 | Kelley | 192/107 R X |
| 3,261,440 | 7/1966 | Graham et al. . | |
| 3,295,572 | 1/1967 | Wing | 145/50 |
| 3,410,382 | 11/1968 | Root et al. | 192/70.3 X |
| 3,473,637 | 10/1969 | Rutt | 192/107 R |
| 3,519,037 | 7/1970 | Linkfield . | |
| 3,552,533 | 1/1971 | Nitz et al. | 192/107 M |
| 3,557,923 | 1/1971 | Nickell . | |
| 3,613,851 | 10/1971 | Ely et al. . | |
| 3,639,197 | 2/1972 | Spain | 192/107 M X |
| 3,640,365 | 2/1972 | Henry . | |
| 3,666,062 | 5/1972 | Riese . | |
| 3,692,150 | 9/1972 | Ruppe, Jr. . | |
| 3,695,407 | 10/1972 | Peery . | |
| 3,724,612 | 4/1973 | Spain . | |
| 3,759,353 | 9/1973 | Marin | 188/71.5 |
| 3,791,499 | 2/1974 | Ryan . | |

(List continued on next page.)

FOREIGN PATENT DOCUMENTS

| | | |
|---|---|---|
| 67113 | 12/1982 | European Pat. Off. . |
| 766161 | 5/1943 | Germany . |
| 2149317 | 4/1973 | Germany . |
| 2357029 | 6/1974 | Germany . |

(List continued on next page.)

OTHER PUBLICATIONS

Manual 1062 Operation, Service and Overhaul Instructions with Illustrated Parts Breakdown Multiple Disk Brakes, published by B.F. Goodrich, Apr. 15, 1963 (Revised Jul. 9, 1965).

(List continued on next page.)

*Primary Examiner*—Rodney H. Bonck
*Attorney, Agent, or Firm*—Poms, Smith, Lande & Rose

[57] ABSTRACT

A carbon to carbon friction mechanism which includes a lightweight pressure plate directly mounted to an adjacent carbon plate so that the pressure plate is kept concentrically aligned during operation of the mechanism. The directly mounted pressure plate and adjacent carbon plate may be used as components of a carbon to carbon friction clutch. Sufficient clearances are provided between the pressure plate and its adjacent carbon plate to allow for thermal expansion of the materials used for the pressure and carbon plates.

22 Claims, 3 Drawing Sheets

U.S. PATENT DOCUMENTS

| | | | |
|---|---|---|---|
| 3,887,041 | 6/1975 | Malone | 188/71.5 |
| 3,902,578 | 9/1975 | Berger et al. | |
| 3,917,043 | 11/1975 | Bok | |
| 3,932,568 | 1/1976 | Watts et al. | 188/251 A X |
| 3,934,686 | 1/1976 | Stimson et al. | 188/251 A |
| 3,970,174 | 7/1976 | Kirkhart | |
| 3,983,974 | 10/1976 | Dowell et al. | 188/264 AA |
| 4,020,937 | 5/1977 | Winter | 192/107 R |
| 4,055,236 | 10/1977 | Dowell | 188/73.2 |
| 4,095,683 | 6/1978 | Ban | 192/109 A X |
| 4,111,291 | 9/1978 | Horstman | |
| 4,117,912 | 10/1978 | Ruppe, Jr. | |
| 4,142,619 | 3/1979 | Spokas | 192/113 B |
| 4,159,656 | 7/1979 | Tomich | |
| 4,225,025 | 9/1980 | Crawford | 192/70.2 |
| 4,249,642 | 2/1981 | Anderson et al. | |
| 4,286,694 | 9/1981 | Wiseman, Jr. et al. | 188/71.5 |
| 4,383,594 | 5/1983 | Correll et al. | 188/71.5 |
| 4,430,064 | 2/1988 | Lamarche | |
| 4,466,524 | 8/1984 | Lane | 192/70.25 |
| 4,677,836 | 7/1987 | Anderson et al. | |
| 4,696,376 | 9/1987 | Reynolds | 188/71.5 |
| 4,744,448 | 5/1988 | Maycock et al. | 192/109 A X |
| 4,779,476 | 10/1988 | Anderson et al. | 74/434 |
| 4,846,326 | 7/1989 | Tilton et al. | 192/70.19 |
| 5,123,510 | 6/1992 | Beccaris et al. | 192/70.13 |
| 5,123,511 | 6/1992 | Beccaris | 192/70.13 |
| 5,127,499 | 7/1992 | Beccaris et al. | 192/70.27 |
| 5,127,504 | 7/1992 | Beccaris et al. | 192/70.13 |
| 5,127,505 | 7/1992 | Beccaris et al. | 192/70.19 |
| 5,181,594 | 1/1993 | Nash | 192/70.27 |

FOREIGN PATENT DOCUMENTS

| | | |
|---|---|---|
| 3540290 | 11/1985 | Germany . |
| 752575 | 7/1956 | United Kingdom . |
| 1091693 | 4/1965 | United Kingdom . |
| 1290553 | 9/1969 | United Kingdom . |
| 1225335 | 3/1971 | United Kingdom . |
| 1300369 | 12/1972 | United Kingdom . |
| 1426416 | 2/1974 | United Kingdom . |
| 1498366 | 3/1976 | United Kingdom . |
| 1573328 | 8/1977 | United Kingdom . |
| 1490743 | 11/1977 | United Kingdom . |
| 2154288 | 9/1985 | United Kingdom . |
| 2167821 | 11/1985 | United Kingdom . |
| 2161560 | 1/1986 | United Kingdom . |
| 2164712 | 3/1986 | United Kingdom . |
| 2212870 | 8/1989 | United Kingdom . |

OTHER PUBLICATIONS

"Mechanical Design and Systems Handbook (Second Edition)", Harold A. Rothbart, published by Mc--Graw-Hill Book Company, Inc., 1964, 1985.

"AP-135 Wheels, Brakes and Antiskid", published by Goodyear Aerospace, Sep. 1966 (Revised Mar. 31, 1986).

Boeing 720 Main Brake Assembly Component Maintenance Manual with Illustrated Parts List, published by Bendix Corporation, May 1, 1966 (Revised Oct. 15, 1977).

"Conveyor 880M Main Brake Assembly Component Maintenance Manual with Illustrated Parts List", published by Bendix Corporation, Nov. 1, 1968 (Revised Jan. 1, 1978).

"Boeing 747 Main Brake Assembly Overhaul Manual and Illustrated Parts List", published by Bendix Corporation, Dec. 1, 1968.

"Ingenious Mechanisms for Designers and Inventors", vol. IV, Edited by John A. Newell and Holbrook L. Horton, published by Industrial Press, Inc., 1969.

"McDonnell Douglas DC-8-63 and DC-8-62H Main Brake Assembly Component Maintenance Manual with Illustrated Parts List", published by Bendix, Jan. 15, 1973 (Revision 12–Oct. 15, 1987).

"Manual 272 Installation, Maintenance and Overhaul 2–1284 Mulitple Disk Brake", published by B.F. Goodrich, Aug. 30, 1972 (Revised Sep. 1, 1973).

"Overhaul Manual for Part Number 2–679, Multiple Disk Brake", published by B.F. Goodrich, Jun. 1975.

"Parallel Side Splines for Soft Broached Holes in Fittings", Oct., 1975.

"Mechanisms in Modern Engineering Design, vol. III, Gear Mechanisms", by Ivan I. Artobolevsky, published by MIR Publishers, 1977.

"Mechanical Engineering Design", Third Edition, by Joseph Edward Shigley, published by Mc-Graw Hill Book Company, 1972.

"Mechanisms in Modern Engineering Design, vol. IV, Cam and Friction Mechanisms Flexible-Link Mechanisms", published by MIR Publishers, 1977.

"Triumph Boneville 1979 Service Manual", p. 40.

"Brake Assembly" published by Goodyear Aerospace, Mar. 1982.

(List continued on next page.)

OTHER PUBLICATIONS

"Boeing 727 Main Landing Gear Multiple Disk Brake", published by B.F. Goodrich Aerospace and Defense Division, Sep. 14, 1984.

"Brake Torque Tube–Spline Repair", published by United Airlines, Nov. 27, 1984.

"Handbook of Practical Gear Design", by Darle W. Dudley, published by Mc-Graw-Hill Book Company, 1984.

"Multiple Disk Brake Stock No. RH1630-776-59-62-XGDC, Part No. 2-723-9", published by Direction of the Commander, Naval Air Systems Command, Aug. 1, 1986.

"Landing Gear Design For Light Aircraft, vol. 1", by Ladislao Pazmany, published by Pazmany Aircraft Corporation, 1986.

"AP-608 Brake Assembly, Part No. 5006575", published by Aircraft Braking Systems Corporation, Feb. 13, 1987.

"Covert Clutches", by Joe Saward, published by Autosport Magazine, Jun. 11, 1987.

"A True Case of Black Magic", by Ian Reed, published in Autoweek Magazine, Aug. 10, 1987.

"Carbon/Carbon Friction Materials for Commercial Brakes and Clutches", by D. W. Gibson and G. J. Taccini, presented at the 5th Annual SAE Colloquium on Brakes, Atlantic City, N.Y., Oct. 5-8, 1987.

"Fundamentals of Gear Design", by Raymond J. Drago, P.E., published by Butterworths, 1988.

Tilton Publication dated Nov., 1989.

C4 Automatic Transmission (no date).

Innovative Design publication, pp. 14-80-14-81 (no date).

"Horstman 2 Disc DXL Clutch" (no date).

"Nonmetallic Shaft–Coupling Details, Engine Driven Accessories" (no date).

McCarty, Design News, Nov. 23, 1987.

McCardell et al., Automotive Engineering Congress, Jan. 8 to Jan. 12, 1968.

Mancuso, Marcel Dekker, Inc., 1986.

Trulson et al., National Sample Technical Conference, Oct. 12 to Oct. 14, 1982.

Nayler, Newness Engineer's Pocket Book, 1971.

Gleason Works, 1973.

Shigley, Mechanical Engineering Design, 1977.

Deutschman, Machine Design Theory and Practice, 1975.

Aircraft Engineering, Sep. 1976.

Stimson et al, Design and Engineering of Carbon Brakes, 1980.

Deutschman, MacMillan Publishing Co., Inc., 1975.

Official Honda Shop Manual Z50R, 1982.

1963 SAE Handbook, 1963.

Boston Gear Full -Line Stock Products Catalog No. 100, 1985.

Dodge Engineering Catalog vol. 1.

Overall Manual-B. F. Goodrich, Dec. 15, 1982.

Broquere, Societe Europeenne de Propulsion, 1983.

LoComb, Advanced Materials Research and Developments, 8th Symposium, 1985.

Dudley, Product Engineering, Oct. 28, 1957.

Technical Manual Navair 03-25GAA-502, Aug. 1, 1986.

Component Maintenance Manual-Loral Aircraft Braking Systems, May 15, 1988.

AP Racing-Automotive Products PLC, 1990.

Boeing 747 Main Brake Assembly Overhaul Manual--Bendix Corporation, Dec. 1, 1969.

Vallance et al, McGraw-Hill Book Company, 1951.

Artobolevsky, Mir Publishers, 1975.

Aircraft Engineering, 1976.

Juvinall, John Wiley & Sons, 1983.

Parmley, Mechanical Components Handbook, 1985.

CARBON TO CARBON FRICTION MECHANISM

CROSS-REFERENCE TO RELATED APPLICATIONS

This is a continuation of application Ser. No. 07/929,299, filed Aug. 13, 1992 and now abandoned The subject matter of this application is related to the subject matter of application, Ser. No. 07/929,728, filed Aug. 13, 1992, and now abandoned, entitled "HUB RETAINING APPARATUS," assigned to Tilton Engineering, Inc., the assignee of the present application.

BACKGROUND OF THE INVENTION

The present invention relates generally to friction operating mechanisms, and more particularly to carbon to carbon friction mechanisms.

In the past, carbon discs or plates have been used to produce lightweight friction operating mechanisms such as clutches. One such carbon to carbon friction clutch is disclosed in U.S. Pat. No. 4,846,326, issued to Tilton et al. on Jul. 11, 1989. In this clutch assembly, carbon plates are used for both the driver and driven plates. Bolts and spacing blocks passing through peripheral apertures in the carbon driver plates and in a pressure plate are used to bolt the clutch assembly to a flywheel. As such, the outer diameter of the pressure plate is sized to accommodate the peripheral apertures needed for the bolts and spacing blocks. This results in increased weight for the clutch assembly.

SUMMARY OF THE INVENTION

It is an object of this invention to provide a carbon to carbon friction mechanism that is lightweight, permitting easier braking, less sluggish gear shifting, and greater rates of acceleration and deceleration.

It is another object of this invention to provide a carbon to carbon friction mechanism that may be used for a clutch or for other mechanisms.

It is still another object of this invention to provide a carbon to carbon friction mechanism that allows operation of the mechanism at high temperatures.

It is still another object of this invention to provide a carbon to carbon friction mechanism that is economical to manufacture.

These and other objects and advantages are attained by a carbon to carbon friction mechanism that includes a lightweight pressure plate directly mounted to an adjacent carbon plate so that the pressure plate is kept concentrically aligned during operation of the mechanism. The directly mounted pressure plate and adjacent carbon plate may be used as components of a carbon to carbon friction clutch. Sufficient clearances are provided between the pressure plate and its adjacent carbon plate to allow for thermal expansion of the materials used for the pressure and carbon plates.

The various features of the present invention will be best understood together with further objects and advantages by reference to the following description of the preferred embodiments taken in conjunction with the accompanying drawings.

DESCRIPTION OF THE PREFERRED EMBODIMENTS

The following specification taken in conjunction with the drawings sets forth the preferred embodiments of the present invention in such a manner that any person skilled in the art can make and use the invention. The embodiments of the invention disclosed herein are the best modes contemplated by the inventors for carrying out their invention in a commercial environment, although it should be understood that various modifications can be accomplished within the parameters of the present invention.

Figure 1:
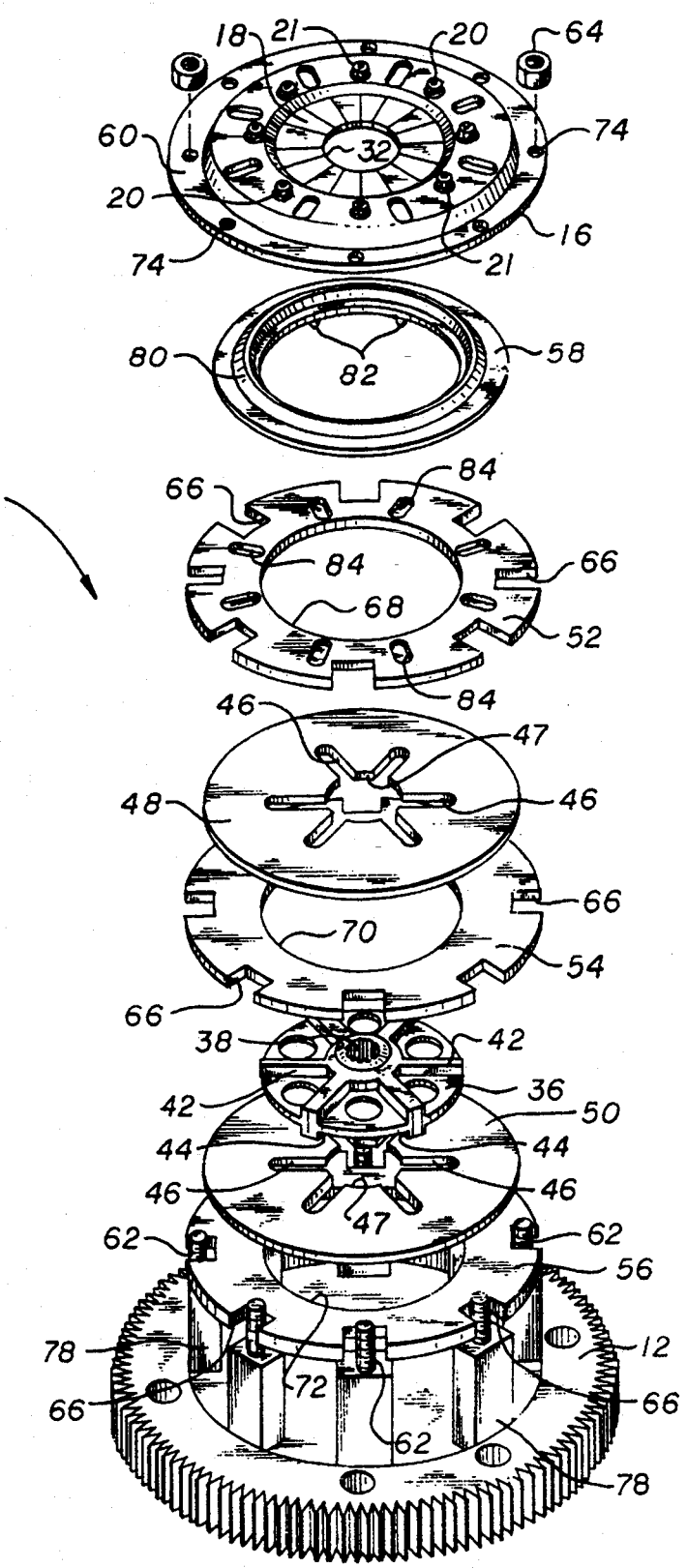
FIG. 1 is an exploded isometric view of the carbon to carbon friction mechanism of the present invention shown used in a friction clutch.

FIG. 1 shows an exploded view of a carbon to carbon friction mechanism 10 of the present invention used in a friction clutch. The clutch may be assembled to a flywheel 12. The flywheel 12, for example, may be rotated by an engine crankshaft (not shown). The clutch uses friction to transmit torque from the engine crankshaft to an output shaft 14 (see FIG. 5), and then, for example, to a gearbox (not shown).

It is important to note that the carbon to carbon friction mechanism 10 may also be used with brakes or any other mechanisms. FIG. 1 illustrates only one practical application of the friction mechanism 10.

Figure 5:
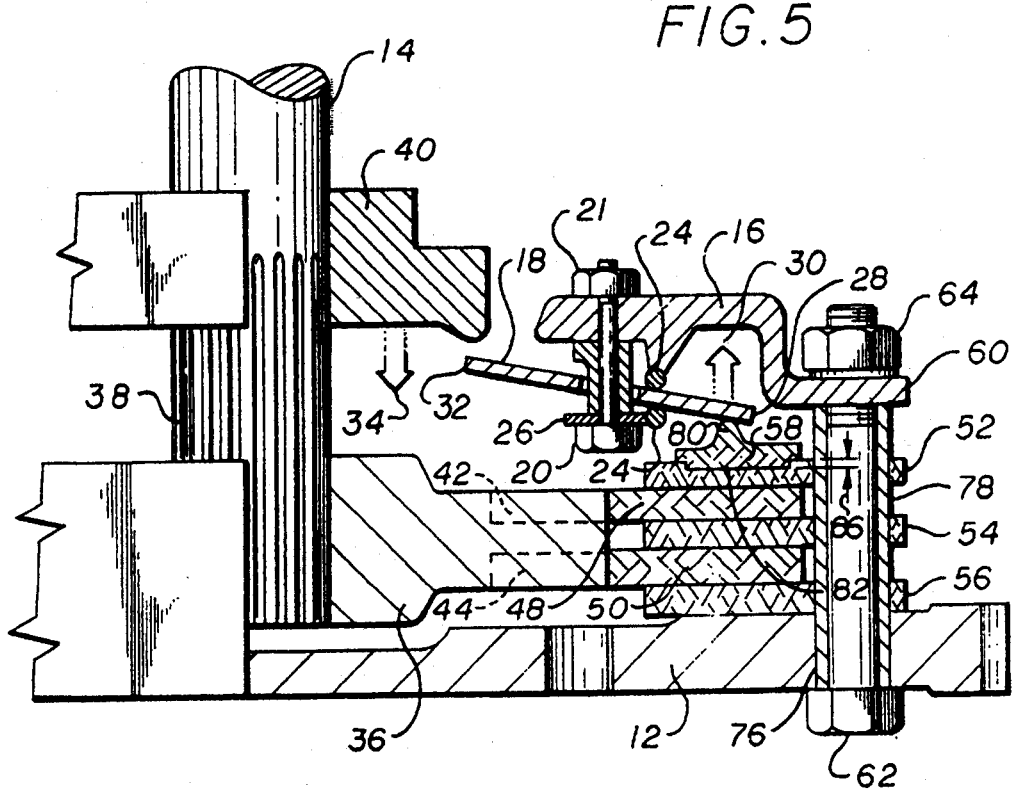
FIG. 5 is an enlarged, partial cross-sectional view of the clutch and flywheel of FIG. 1, showing the clutch assembled to an output shaft and interacting with a throwout bushing.

The clutch of FIG. 1 is an improvement to the carbon to carbon friction clutch described in U.S. Pat. No. 4,846,326, issued to Tilton et al. on Jun. 11, 1989, the disclosure of which is hereby incorporated by reference thereto. The parts of the clutch are shown in FIGS. 1 and 5. A clutch cover 16 is bolted to a diaphragm spring 18 by a plurality of bolts 20 and nuts 21. Any number of bolts 20 may be used. Also, any type of spring may be used instead of diaphragm spring 18, and any other desirable type of fastener may be used instead of bolts 20 for the purpose of attaching the spring 18 to the cover 16. Pivots, 24 attached to the cover 16 and washers 26, allow an outer periphery 28 of the spring 18 to move upward as indicated by arrow 30 in FIG. 5, when an inner periphery 32 oil the spring 18 is forced downward as indicated by arrow 34.

A coupling hub 36 having a splined central aperture 38 is engaged to splines 38 of the output shaft 14, so that the shaft 14 will rotate with the hub 36. As shown in FIG. 5, a throwout bushing 40 is free to move longitudinally along shaft 14 for the purpose of forcing inner periphery 32 of spring 18 downward and outer periphery 28 upward in order to disengage the clutch, as discussed below. Bushing 40 is moved downward, for example, by a foot pedal in an automobile, or by any desirable means.

As shown in FIG. 1, the coupling hub 36 has top and bottom radial fingers 42 and 44, respectively. The fingers 42 and 44 engage radial slots 46 extending from apertures 47 in driven carbon plates 48 and 50 positioned at the top and bottom sides of the hub 36. As such, the driven carbon plates 48 and 50 rotate with the coupling hub 36. The hub 36 is preferably made out of a lightweight metal such as aluminum. However, any desirable metal may be used. Sufficient clearances are provided between the metal fingers 42 and 44 and the radial slots 46 of the carbon plates 48 and 50 to allow for the difference in thermal expansion between carbon and metal during high operating temperatures.

It is important to note that any number of fingers 42 and 44 and slots 46 may be used. Also, the shape or configuration of the fingers and slots may be varied as desired.

As best shown in FIG. 5, driver carbon plates 52, 54 and 56 are disposed, respectively, above, between and below the driven carbon plates 48 and 50, when the clutch is assembled to the flywheel 12. Plates 52, 54 and 56 have inner diameters 68, 70 and 72, respectively, which are preferably equal. However, the diameters 68, 70 and 72 may vary if desired. As discussed below, a pressure plate 58 is directly mounted on top of driver carbon plate 52. The pressure plate 58 is preferably made from metal. However, any desirable material may be used for the plate 58 such as carbon.

Figure 2:
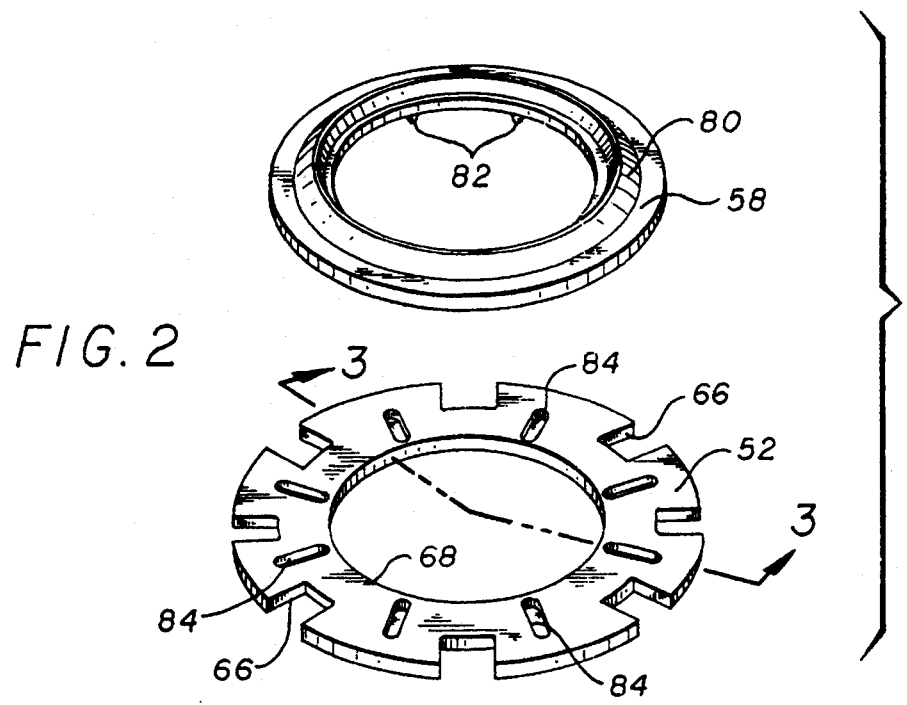
FIG. 2 is an exploded isometric view of a pressure plate with downwardly extending lugs and of a carbon plate with radial slots that are used with the friction mechanism of FIG. 1.

The clutch cover 16 has peripheral apertures 74 in an annular outer portion 60 thereof. Likewise, the carbon driver plates 52, 54 and 56 have peripheral apertures 66 therein as shown in FIG. 2, and the flywheel 12 has corresponding peripheral apertures 76 therein (see FIG. 5).

Assembly of the clutch is achieved by stacking the components on top of the flywheel 12, and passing spacing blocks 78 through apertures 76 in the flywheel 12, and through apertures 66 in the driver carbon plates 52, 54 and 56. Bolts 62 and nuts 64 are then used to bolt the assembly together as shown in FIG. 5. Note that the bolts 62 also pass through the apertures 74 in the cover plate 16. Any number of bolts and apertures may be used.

When the clutch assembly is bolted together, the spring 18 bears against an annular upward portion 80 of the pressure plate 58 so that the clutch is engaged, causing the driver and driven plates 48 through 56 to be in frictional contact with each other. The spring 18 bears against or provides sufficient force to keep the plates 48 through 56 in mutual frictional contact so that torque is transmitted from the flywheel 12 (or engine crankshaft) to the output shaft 14. The coefficient of friction of the carbon plates 48 through 56 increases with temperature, a desirable property due to high operating temperatures experienced during repeated engagement and disengagement of the clutch.

The clutch may be disengaged by stepping on a foot pedal or otherwise causing the throwout bushing 40 to move down the shaft 14, as indicated by arrow 34 in FIG. 5 so that the bushing 40 contacts the diaphragm spring 18 and forces inner periphery 32 of the spring 18 downward. This action causes outer periphery 28 of the spring 18 to move upward as indicated by arrow 30, and reduces bearing forces acting on upward portion 80 of the pressure plate 58. As the bearing forces are reduced, the carbon plates 48 through 56 loosen and frictional contact is no longer maintained between the plates. Loosening of the stack of plates occurs because the reduction in bearing forces allows the driver plates 52, 54 and 56 to move longitudinally along the spacing blocks 78, and the driven plates 48 and 50 to move upward due to radial slots 46. After loosening of the plates 48 through 56 occurs, the clutch is disengaged and torque is no longer transmitted from the flywheel 12 to the output shaft 14.

Figure 3:
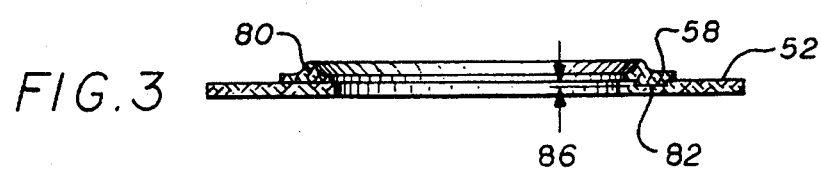
FIG. 3 is a cross-sectional view taken in the direction of arrows 3—3 of FIG. 2 after the pressure plate is mounted on the carbon plate.

Inside diameters 68, 70 and 72 of the driver carbon plates 52, 54 and 56, respectively, are sized to provide lightweight plates. FIGS. 2 and 3 show the pressure plate 58 and driver carbon plate 52 of the friction mechanism 10 that also help to reduce the weight of the clutch, permitting easier braking, less sluggish gear shifting, and greater rates of acceleration and deceleration.

The pressure plate 58 is mounted directly on carbon plate 52, thereby eliminating the peripheral apertures typically used to couple the plate to the spacing blocks 78, which reduces the weight of the clutch.

As shown in FIGS. 2 and 3, the pressure plate 58 has a plurality of downwardly extending lugs 82 at the bottom thereof, and the carbon plate 52 has a plurality of corresponding radial slots 84 extending a depth 86 (see FIGS. 3 and 5) into the plate 52 at the top thereof. The shape of the slots 84 matches the shape of the lugs 82. Depth 86 is sufficient to provide the accurate concentric location of pressure plate 58 at any operating speed or temperature.

The radial slots 84 and lugs 82 are dimensioned and located so that the pressure plate 58 is disposed concentrically in the clutch assembly, and annular upward portion 80 is located for contact with spring 18. In other words, pressure plate 58 is kept concentrically aligned by the lugs 82 and slots 84 during operation of the clutch, and is not free to move radially, with the exception of slight movement which occurs due to clearances between the lugs 82 and slots 84. Such clearances between the lugs 82 and slots 84 allow for the difference in thermal expansion of the materials used for the plates 52 and 58. Any desirable number of slots 84 and lugs 82 may be used. The pressure plate 58 may be easily assembled to carbon plate 52 by fitting the lugs 82 into the radial slots 84 before the clutch assembly is bolted to the flywheel 12.

Figure 4:
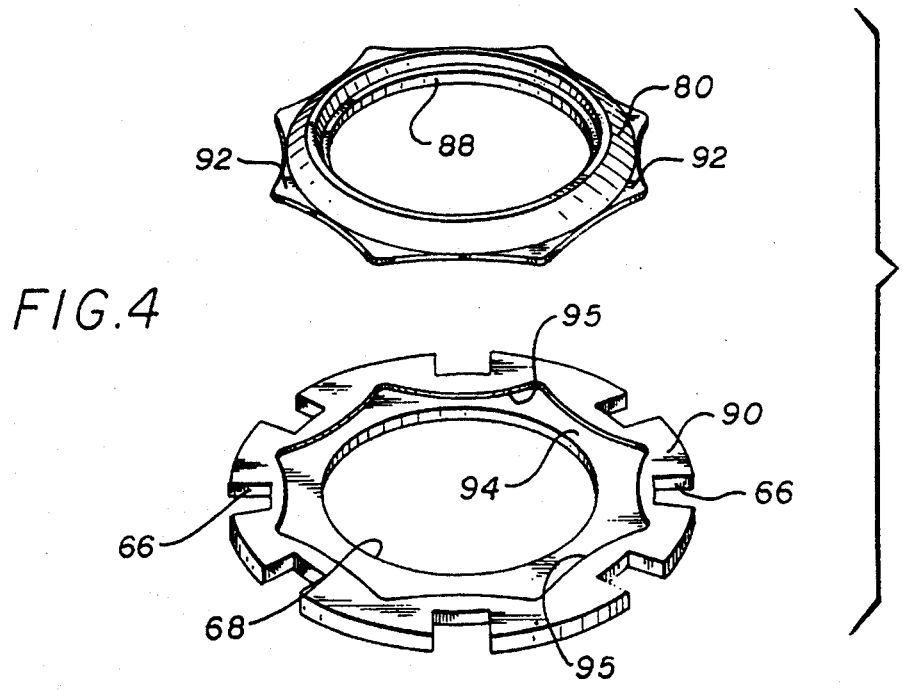
FIG. 4 is an exploded isometric view of another embodiment of the pressure plate with a shaped outer periphery, and of another embodiment of the carbon plate having a corresponding recess that matches the shaped periphery.

FIG. 4 shows another embodiment of a pressure plate 88 and another embodiment of a driver carbon plate 90 of the present invention. The pressure plate 88 has a shaped outer periphery 92. The carbon plate 90 has a corresponding or mating recess 94 in the top thereof that is dimensional or shaped so that the pressure plate 88 will fit into the recess 94 and the shaped outer periphery 92 will match the outer periphery 95 of the recess 94. The shaped outer periphery 92 and the recess 94 may have any desirable shapes or configurations. The pressure plate 88 is directly assembled to the plate 90 and does not use peripheral apertures. Therefore, an advantageous lightweight design is provided as explained above. Also, sufficient clearances are provided between the shaped outer periphery 92 and outer periphery 95 to allow for differences in thermal expansion rates.

Figure 6:
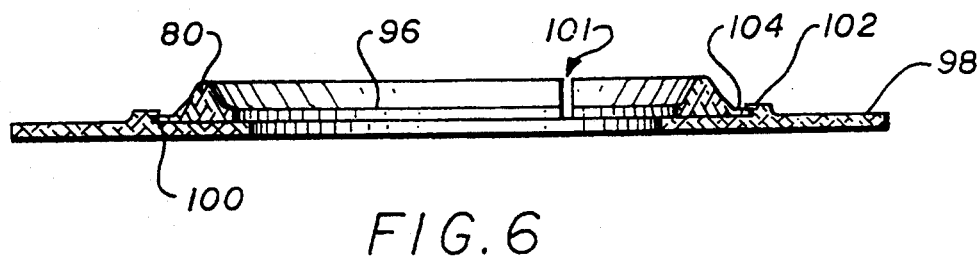
FIG. 6 is a cross-sectional view of another embodiment of a pressure plate with an annular peripheral portion, and of another embodiment of a carbon plate having a corresponding peripheral groove, showing the pressure plate mounted on the carbon plate.

Referring now to FIG. 6, another embodiment of a pressure plate 96 is shown assembled to another embodiment of a driver carbon plate 98. The pressure plate 96 has an annular peripheral portion 104 which engages a corresponding peripheral groove 100 in the carbon plate 98 formed by an annular lip portion 102. At least one radial slit 101 is provided in the pressure plate 96 which allows the plate 96 to be reduced in size at its outer periphery for insertion of extension 104 into groove 100 during assembly. The slit 101 also allows for thermal expansion of the plate 96 at operating temperatures. Also sufficient clearances are provided between portion 104 and groove 100 to allow for the difference in thermal expansion of the materials used for the plates 96 and 98. The lightweight design of the plate 96 provides the advantages discussed above.

Figure 7:
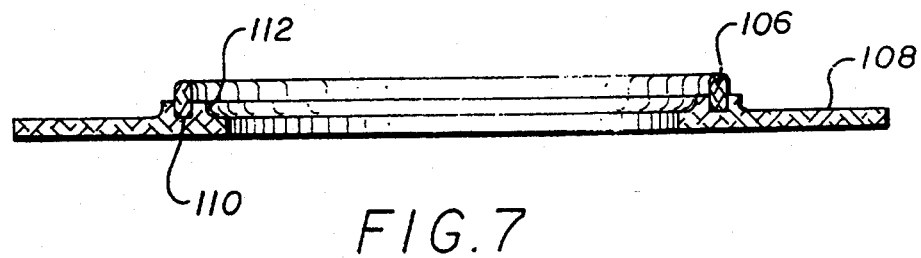
FIG. 7 is a cross-sectional view of an annular fulcrum, and of another embodiment of a carbon plate having an upwardly extending annular portion with an annular groove therein, showing the annular fulcrum mounted in the annular groove.

FIG. 7 shows yet another embodiment of an annular fulcrum 106, and of another embodiment of a driver carbon plate 108 having an upwardly extending annular portion 112 with an annular groove 110 therein. As shown, the annular fulcrum 106 is mounted in or engages the annular groove 110. The groove 110 is of sufficient depth to assure that the annular fulcrum 106 will remain in the groove 110 during assembly and all phases of operation of the clutch. Sufficient clearances are provided between the fulcrum 106 and groove 110 to allow for the difference in thermal expansion of the materials. The lightweight design of the annular pressure plate fulcrum provides the advantages discussed above.

The above clutch assembly uses five carbon plates. However, the carbon-to-carbon friction mechanism 10 design of the present invention may be used with any desirable number of carbon plates, and metal plates may be used instead of carbon plates, if desired. Also, the friction mechanism has particular application in automobile racing, but may be used with any type machinery.

The above description discloses the preferred embodiments of the present invention. However, persons of ordinary skill in the art are capable of numerous modifications once taught these principles. Accordingly, it will be understood by those skilled in the art that changes in form and details may be made to the above-described embodiments without departing from the spirit and scope of the invention.

We claim:
1. A clutch assembly comprising:
a hub;
a driven plate coupled to said hub;
a pressure plate;
a driver plate positioned directly adjacent said pressure plate;
coupling means for coupling said pressure and driver plates such that said pressure plate is positioned concentrically relative to said driver plate and said pressure plate rotates concentrically with said driver plate; and
biasing means for biasing said driver and driven plates together into frictional contact and thereby allowing the transmission of torque through said driven and driver plates to said hub;
wherein said coupling means includes an annular peripheral portion on one of said pressure and driver plates and a peripheral groove in the other and which is engaged by said peripheral portion.

2. The clutch assembly of claim 1 wherein said peripheral portion is on said pressure plate and said peripheral groove is in said driver plate.

3. The clutch assembly of claim 1 wherein said driven plate comprises a carbon driven plate and said driver plate comprises a carbon driver plate.

4. The clutch assembly of claim 1 wherein said pressure plate includes an annular portion and said biasing means includes a spring which biases against said annular portion.

5. A clutch assembly comprising:
a hub;
a driven plate coupled to said hub;
a pressure plate;
a driver plate positioned directly adjacent said pressure plate; and
a spring biasing said driver and driven plates into frictional contact and thereby transmitting torque through said driven and driver plates to said hub;
wherein one of said pressure and driver plates includes a projection and the other includes a corresponding opening, said projection engaging said opening such that said pressure plate is positioned concentrically with respect to said driver plate and rotates concentrically therewith; and
wherein said projection comprises an annular peripheral portion and said opening comprises a peripheral groove.

6. The clutch assembly of claim 5 wherein said driven plate comprises a carbon driven plate and said driver plate comprises a carbon driver plate.

7. The clutch assembly of claim 5 wherein said pressure plate includes an annular portion against which said spring bears.

8. A clutch assembly comprising:
a hub;
a carbon driven plate coupled to said hub;
a clutch cover having legs;
carbon driver plate means for carrying torque reaction from said driven plate into said legs;
pressure plate means, positioned directly adjacent to said driver plate means and mechanically unfastened thereto, for providing an axial clamping force between said driver plate means and said driven plate, said force transmitting no torque from said pressure plate means to said hub;
lug means on at least one said pressure plate means and said driver plate means for concentrically and rotationally positioning said pressure plate means relative to said driver plate means; and
biasing means for biasing said driver plate means and said driven plate together into frictional contact.

9. The clutch assembly of claim 8 wherein said lug means includes a plurality of lugs extending perpendicularly from said pressure plate means spaced inwardly from the outer periphery thereof.

10. The clutch assembly of claim 8 wherein said lug means includes a plurality of lugs extending peripherally out from edges of said pressure plate means.

11. A clutch assembly comprising:
a hub;
a driven plate coupled to said hub;
a pressure plate;
a driver plate; and
spring biasing means for biasing said driven and driven plates together into direct frictional contact;
wherein one of said pressure plate and said driver plate includes a lug;

wherein the other of said pressure plate and said driver plate includes a lug receiving surface; and wherein said lug engages in said lug receiving surface such that said pressure plate is positioned concentrically relative to and rotates concentrically with said driver plate and such that said pressure and driver plates are mechanically unfastened and separable from one another by simple outward relative axial movement.

12. The clutch assembly of claim 11 wherein said pressure plate includes said lug and said driver plate includes said lug receiving surface.

13. The clutch assembly of claim 11 wherein said lug extends parallel to the axis of said pressure and driver plates.

14. The clutch assembly of claim 11 wherein said lug extends perpendicular to the axis of said pressure and driver plates.

15. The clutch assembly of claim 11 wherein said lug receiving surface comprises a radial slot.

16. The clutch assembly of claim 11 wherein said lug receiving surface comprises a ledge.

17. The clutch assembly of claim 11 wherein said driven plate comprises a carbon driven plate and said driver plate comprises a carbon driver plate.

18. The clutch assembly of claim 11 wherein said driver plate has peripheral apertures defining a driver plate diameter, said pressure plate has an outermost pressure plate diameter and said outermost pressure plate diameter is no greater than said driver plate diameter.

19. The clutch assembly of claim 11 further comprising a cover, a flywheel and spacing blocks separating said cover from said flywheel.

20. The clutch assembly of claim 19 wherein said driver plate includes peripheral apertures each receiving therein a respective one of said spacing blocks.

21. A clutch assembly comprising:
a hub;
a carbon driven plate coupled to said hub;
a pressure plate;
a carbon driver plate positioned directly adjacent said pressure plate;
a coupling assembly which couples said pressure and driver plates such that said pressure plate is positioned concentrically relative to and rotates concentrically with said driver plate and so that said pressure and driver plates are separable from one another by simple outward relative axial movement, said coupling assembly allowing for different thermal expansion rates of said pressure and driver plates due to their different materials, by their relative fit and by maintaining them mechanically unfastened relative to one another; and
a biasing assembly which biases said driver and driven plates together into frictional contact and thereby allows the transmission of torque through said driven and driver plates to said hub;

wherein said coupling assembly includes a lug on said pressure plate and a recessed receiving surface on said driver plate and cooperable with said lug; and wherein said lug extends substantially parallel to the axis of said pressure and driver plates.

22. A clutch assembly comprising:
a hub;
a carbon driven plate coupled to said hub;
a pressure plate;
a carbon driver plate positioned directly adjacent said pressure plate;
a coupling assembly which couples said pressure and driver plates such that said pressure plate is positioned concentrically relative to and rotates concentrically with said driver plate and so that said pressure and driver plates are separable from one another by simple outward relative axial movement, said coupling assembly allowing for different thermal expansion rates of said pressure and driver plates due to their different materials, by their relative fit and by maintaining them mechanically unfastened relative to one another; and
a biasing assembly which biases said driver and driven plates together into frictional contact and thereby allows the transmission of torque through said driven and driver plates to said hub;

wherein said coupling assembly includes a lug on said pressure plate and a recessed receiving surface on said driver plate and cooperable with said lug; and wherein said receiving surface comprises a peripheral groove.

* * * * *